United States Patent Office 3,690,823
Patented Sept. 12, 1972

3,690,823
MANUFACTURE OF SILICA-RICH ZEOLITES
Dean Arthur Young, Yorba Linda, Calif., assignor to Union Oil Company of California, Los Angeles, Calif.
No Drawing. Continuation-in-part of application Ser. No. 516,662, Dec. 27, 1965. This application Apr. 16, 1969, Ser. No. 816,810
Int. Cl. C01b 33/28
U.S. Cl. 423—338
19 Claims

ABSTRACT OF THE DISCLOSURE

Zeolites of the Y crystal type are produced by digesting an aqueous reaction mixture comprising silica gel synerized at a pH between about 5.5 and 10, preferably between about 6 and 9, and sodium aluminate at an elevated temperature. The particular silica gel employed permits the production of good yields of Y-type zeolites having a silica to alumina mole ratio of above 3.9 under mildly alkaline conditions heretofore considered possible only in conjunction with silica hydrosols and reactive amorphous solid silicas.

---

This application is a continuation-in-part of my co-pending application, Ser. No. 516,662, filed Dec. 17, 1965, now abandoned.

This invention relates to new and economical methods for the manufacture of certain crystalline molecular sieve zeolites. Specifically, the invention is concerned with the manufacture of zeolites of the Y crystal type, particularly those having a relatively high $SiO_2/Al_2O_3$ mole-ratio between about 3.9 and 6.0.

In a broad aspect the new method comprises digesting a silica gel, previously precipitated at a relatively neutral pH, i.e., within the range of 6 to about 10, preferably between about 6 and 9, with an aqueous solution of sodium hydroxide and sodium aluminate at elevated temperatures until the desired precipitation of crystalline zeolite takes place. The mole-ratios of reactant materials during the digestion step is also a critical aspect of the invention, as will be explained more in detail hereinafter.

PRIOR ART AND BACKGROUND

Zeolites of the Y crystal type and methods for their preparation are described in U.S. Patent No. 3,130,007 to Breck. These Y zeolites, though possessing a definite single crystal form, can be prepared so as to display significant differences in chemical composition, notably as to zeolitic cations present, and the $SiO_2/Al_2O_3$ mole-ratio in the crystal lattice. The general formula for the sodium Y zeolites is expressed as follows:

$$0.9 \pm 0.2 Na_2O Al_2O_3 : W SiO_2 : X H_2O$$

where X=0 to about 9, and W=3.0 to about 6.

The sodium in these zeolites can be replaced by numerous other cations, and a unique feature is that the sodium can be exchanged with ammonium ion and the resulting ammonium zeolite heated to decompose the ammonium ions, leaving a hydrogen form of the zeolite (sometimes referred to as a "decationized" form) which still retains the same essential crystal structure.

The Y zeolites are useful in many industrial applications. They can be used as adsorbents to separate mixtures of compounds or to purify gas streams. They can also be used as catalysts or bases for catalysts. In particular, it has recently been discovered that the Y zeolites in their hydrogen form, or in a polyvalent metal form, are useful catalysts for isomerization, cracking, and particularly for hydrocracking. For purposes of hydrocracking or isomerization, a hydrogenating metal such as palladium, platinum or nickel is added thereto as by impregnation or ion exchange.

The present invention is concerned particularly with Y zeolites which are useful as cracking catalysts or hydrocracking catalyst bases. For these purposes it is desirable to use zeolites having a relatively high $SiO_2/Al_2O_3$ mole-ratio of between about 3.9 and 6. These silica-rich zeolites are more stable in their hydrogen forms, and produce a much more satisfactory catalyst than the zeolites having lower $SiO_2/Al_2O_3$ mole ratios.

The Y zeolites having a $SiO_2/Al_2O_3$ mole-ratio of about 3 to 3.9 can be cheaply prepared by methods described in the above-noted Breck patent, which in general involves digesting aqueous solutions of sodium hydroxide and sodium aluminate with either silica gel or sodium silicate at elevated temperatures. The raw materals required for manufacturing these low-silica zeolites are quite inexpensive. However, all attempts to prepare silica-rich Y zeolites having a silica to alumina mole-ratio above about 3.9 directly from sodium silicate solutions, or from silica gels, have been unsuccessful.

The methods for manufacturing Y zeolites described in said Breck patent may be divided into two important categories, depending upon the nature of the silica source. In the first category, the silica source is either a colloidal silica hydrosol or a "reactive amorphous solid silica," and in these cases the digestion step is carried out under mildly alkaline conditions involving the use of reaction mixtures wherein the $Na_2/SiO_2$ mole-ratio is between about 0.2 and 0.8. In the second category, the silica source is either sodium silicate or silica gel, and in these cases the digestion is carried out under more highly alkaline conditions wherein the mole-ratio of $Na_2O/SiO_2$ in the reactant mixture ranges between 0.6 and 2.1. When a Y zeolite having a $SiO_2/Al_2O_3$ mole-ratio above 3.9 is desired, it is said that the silica source should be either silica hydrosol, or a "reactive amorphous solid silica," and that the ratio of $Na_2O/SiO_2$ in the reactant mixture should range between 0.28 and 0.4.

It would appear from the foregoing disclosures that mildly alkaline aluminosilicate digestion mixtures (wherein the $Na_2/SiO_2$ mole-ratio is below 0.4) are critical to obtain a silica-rich Y zeolite. But these mildly alkaline digestion methods are disclosed as operable only in conjunction with silica sources of sub-micron particle size such as silica hydrosols, or the "reactive amorphous solid silicas" such as fume silicas, precipitated silica sols and other finely divided silicas such as "Santocel," "Cab-O-Sil," "Hi-Sil" and "QUSO." All of these silica sources are expensive and/or disadvantageous to use in aqueous digestion methods. The silica hydrosols, as exemplified by the commercial "Ludox," are prepared by exhaustive ion exchanging of dilute sodium silicate solutions followed by careful concentration and stabilization by the addition of controlled amounts of a suitable base. The resulting hydrosols are several times as costly as sodium silicate on an equivalent $SiO_2$ basis. The "amorphous solid silicas" are in most cases prepared from silica hydrosols and accordingly are even more expensive, as are the dry aerogels and flame blown silicas such as "Cab-O-Sil." Moreover, these aerogels and flame blown silicas are fluffy sub-micron size powders having a very low bulk density and are difficult to incorporate into a wet digestion process in that they tend to produce non-stirrable gelatinous mixtures. According to the present invention, the necessity of using silica hydrosols, or other small-particle silica sources is avoided, and an inexpensive type of silica gel is employed which may be produced directly from sodium silicate solutions.

It would further appear from the disclosure of the Breck patent that the mildly alkaline digestion mixtures, critical for obtaining silica-rich Y zeolites, were not considered applicable where silica gel or sodium silicate solutions are employed as the source of silica. This conclusion is affirmed herein as regards sodium silicate solutions, but appears to be only partly true in respect to silica gels. It has now been discovered that if typical silica gels of commerce are employed, which are normally prepared by precipitation at pH conditions below about 5, the mildly alkaline digestion conditions are, in fact, ineffective for the manufacture of Y zeolites, the major crystalline product obtained in such cases being either cubic or tetragonal phillipsite. Only by employing highly alkaline digestion mixtures wherein the $Na_2O/SiO_2$ mole-ratio is above about 0.4 can significant yields of Y zeolite be obtained from such acid-precipitated silica gels. But, if the alkalinity of the digestion mixture is increased to obtain significant yields of Y zeolite, then the $SiO_2/Al_2O_3$ mole-ratio of the product is low, below about 3.9.

The major discovery upon which the present invention is based is that if a silica gel is employed which was precipitated as a synerized gel from aqueous solution, hydrosol or hydrogel at a pH above about 5.5, below about 10, and preferably between about 6 and about 9, the subsequent aluminosilicate digestion step may be carried out under the mildly alkaline conditions heretofore considered operable only in conjunction with expensive silica hydrosols or reactive amorphous solid silicas to give good yields of highly crystalline Y zeolite having silica/alumina mole-ratios in the range of 3.9 to 6, usually between 4 and 5.5. The results are achieved only by using as a silica source a silica hydrogel or dried silica gel prepared under conditions such that a substantial degree of polymerization, e.g., gel structure formation, occurs at a relatively neutral pH, preferably within the range of about 6 to about 9.

In U.S. Pat. No. 3,227,660, Ser. No. 237,390, filed Nov. 13, 1962, a method is described for preparing silica-rich Y zeolites from silica gel, an aspect of said method being that the finished silica gel is washed and subjected to a pretreatment with sodium hydroxide solution to effect partial peptization thereof prior to the aluminosilicate digestion step. I have found that the partial peptization pretreatment is an unnecessary added expense and can be eliminated, provided the initial silica gel is precipitated under the pH conditions required herein. This distinction is due to the fact that the silica sources prepared in accordance with this invention are of such chemical composition and structure distinguished from those otherwise prepared, e.g., at relatively low pH, as illustrated in U.S. Pat. No. 3,227,660, that they enable the formation of crystalline aluminosilicates having $SiO_2/Al_2O_3$ ratios in excess of 3.9. For purposes of this invention it is preferred that the silica gel be incorporated into the metal aluminosilicate reaction mixture without prior caustic treatment at any pH above about 10. It is also noted that the process of Pat. No. 3,227,660 requires a hydrous silica gel containing at least about 40% by weight of water, whereas in the present case silica gels dried to a water content below about 20% by weight are superior to the more hydrous gels.

In view of the foregoing, it will be apparent that a major objective of the invention is to provide economical methods for preparing silica-rich Y zeolites. Another objective is the provision of a zeolite preparation method which does not necessitate the use of expensive silica sources such as stabilized submicron silica hydrosols or micron-size amorphous silicas. A further objective is to improve the efficiency of conversion of the silica source to Y zeolites, thereby minimizing waste of reactants which occurs when an excess of siliceous reactant is employed. Another objective is to effect economies in processing by reducing the volume of aqueous reactants which must be handled.

Other objectives will become apparent from the more detailed description which follows.

PROCESS DETAILS

Preparation of silica gel

In accordance with one embodiment of this invention aluminosilicates are prepared from silica gels formed by contacting at least one of silicic acid, preferably monosilicic acid, and alkali metal silicates, in the presence or absence of partially polymerized silica hydrogels or hydrosols or a minor proportion of alkaline earth metal silicate in intimate admixture with an aqueous medium at a pH of from about 6 to about 10. The desired silica gels are most conveniently prepared from either the alkali metal silicates, preferably sodium silicate, or silicic acid, preferably monosilicic acid. Polysilicic acids, e.g., having up to 4 silicon atoms per mole can also be employed, although their application in this procedure is less preferred due to their lower solubility in the aqueous reaction medium and their relatively lower reaction rates. When using any one or a combination of these starting materials, the silica source can be added directly to an aqueous medium having a pH within the prescribed range at conditions sufficient to promote gel formation. However, gel formation at these conditions, particularly at relatively high silica concentrations, is generally so rapid that complete mixing is difficult. It is, therefore, preferable to form the solution at a relatively low pH, i.e., below about 4, at which the gelation rate is reduced, followed by the addition of base to obtain the desired pH value. In this embodiment it is preferred that contacting at the lower pH be continued only so long as necessary to achieve adequate mixing which can be achieved very rapidly, e.g., in five seconds or less. Extensive polymerization at the lower pH is undesirable and detracts from the quality of the finished silica.

In the alternative, the noted silica sources, i.e., alkali metal silicates and silicic acid can be first dissolved in a relatively neutral media and then acidified to a pH below 6 to effect partial polymerization at the lower pH, followed by the addition of sufficient base to adjust the pH to a value within the prescribed range at which the terminal stages of the polymerization are effected. It should be noted, however, that the only apparent advantage of initially contacting at a low pH is that more adequate mixing can be achieved. Localized concentration gradients are thereby minimized. Consequently the most convenient practice involves dispersion of the reactants at a low pH followed by addition of base after dispersion is achieved. Conversely, the silica source may be dissolved in a relatively alkaline solution, e.g., having a pH of 10 or more, followed by the addition of sufficient acid to reduce the pH to a value below about 10 and not less than about 6. In any event, it is essential that the duration of aging at a pH outside the prescribed range be less than that required to form a stable synerized gel.

This degree of polymerization, i.e., syneresis, is readily characterized by the "rod test" described by Hurd and Miller in the Journal of Physical Chemistry, vol. 36 (1936) at page 2196. Briefly, this method involves positioning a three millimeter glass stirring rod in a hydrogel at an angle of 20° to the vertical and determining the time at which the rod no longer deviates from that position. If the rod does not fall over, the hydrogel is firmly set. Care should be taken to avoid this degree of polymerization outside the prescribed pH range. Obviously this test applies to continuous, i.e., all-embracing, gels and provides no meaningful indication of gel characteristics in heterogeneous systems. The use of heterogeneous systems wherein the gel matrix is discontinuous is sometimes preferred to accelerate the formation of the desired gel structure. In such systems a partially polymerized gel is separated into smaller portions to expedite mass transfer between the gel and aqueous phase. In any event, however, the necessary contact time established by the "rod test" in a continuous gel phase is indicative of the contact time required in the noted heterogeneous system.

The alkaline earth metal silicates, when employed in the absence of additional silica sources, are not suitable precursors for the silica gels herein involved. However, a minor amount of an alkaline earth metal silicate can be added along with the alkali metal silicates or silicic acid sources referred to above. The use of calcium silicate is particularly preferred in this embodiment and ultimately results in the production of an aluminosilicate in which a portion of the alumina tetrahedra are associated with calcium ions. However, the concentration of the alkaline earth metal silicate in this embodiment should not exceed about 20 wt. percent of the total equivalent silica concentration of the silica gel reaction medium.

The particular silica gels employed in this invention can also be produced from silica hydrogels and/or silica hydrosols in which polymerization, i.e., syneresis is incomplete and has not been terminated. For example, a silica hydrogel or hydrosol prepared by the partial polymerization of silicic acid or an alkali metal silicate at a relatively acidic pH, e.g., below 4, can be intimately admixed with sufficient base to raise the pH to a value within the prescribed range, at which polymerization is allowed to continue.

The preferred silica sources are the alkali metal silicates in view of the ease with which the procedures of this invention can be effected when the alkali metal silicates, particularly sodium silicate, are employed as starting materials. However, it is believed that the mechanism by which silica gels are resolved from water soluble silicates involves the formation and polymerization of the mono- and polysilicic acid units to first form polymerized chains of —Si—O—Si—groups that, which on further growth and aging, interpolymerize and cross-link to form a three dimensional gel matrix. The spaces between the polymer molecules are, of course, occupied by water when the gel is formed in aqueous medium. Such a material in which the interstitial volume is occupied by water is commonly referred to as a silica hydrogel, as discussed by Alexander and Johnson in Colloid Science, vol. 2, Oxford Clarendon Press (1949), chapter 21, beginning at page 585. If contact or aging of such a silica gel is continued in the presence of aqueous medium at a suitable pH, cross-linking and inter-polymerization between adjacent polymer chains continues with a consequent contraction of the hydrogel. As the silica hydrogel contracts the occluded volume, i.e., residual interstitial volume, is diminished with the result that interstitial water is expelled from the gel. This phenomena is commonly referred to as precipitation or syneresis and is discussed in more detail by Alexander and Johnson in their work Colloid Chemistry, particularly at pages 588 through 604. I have now found that when a substantial degree of precipitation, i.e., syneresis, is effected in an aqueous medium at a pH of from about 6 to about 10 a product is resolved which has greatly superior qualities as a precursor for zeolite Y. These materials are particularly attractive in the direct preparation of crystalline zeolite Y having silica to alumina ratios of at least about 3.9 which can not be otherwise prepared without substantial subsequent treatment.

The reaction medium that forms on subjecting the aqueous silica source to the prescribed pH must, of course, be maintained at a temperature sufficient to promote the continued polymerization and cross-linking within the hydrogel. It is well known that silica gels can be prepared at widely variant temperatures with the higher temperatures generally promoting more rapid gel formation. As a practical matter, the temperatures employed should be within the range of about 0 to about 90° C., preferably about 0 to about 50° C. At temperatures within this range a substantial degree of gel formation can be accomplished practically instantaneously at silica concentrations equivalent to a dilution factor of 100 $H_2O/SiO_2$ or less, on a molar basis. However, for purposes of practicality it is usually preferred to continue digestion for at least about 20 minutes at the prescribed pH to assure a high degree of conversion.

Another consideration which must be kept in mind is the degree of dilution employed during these digestion procedures. More rapid formation occurs at higher concentrations, i.e., lower dilutions, although relatively thin gels can be formed at effective silica concentrations as low as 500 $H_2O/SiO_2$. I have also discovered that considerable advantage in silica quality as well as process economy is obtained by precipitating the silica gel at relatively high silica concentrations. I have unexpectedly found that the hydroxyl content of the final silica is sharply modified by decreasing the $H_2O/SiO_2$ molar ratio in the silica gel formation step. For this reason it is presently preferred to employ reactant concentrations expressed as oxide mole ratios of less than about 130 $H_2O/SiO_2$ and preferably within the range of from about 10 to about 100 $H_2O/SiO_2$. The use of higher silica concentrations also obviates the necessity of handling inordinate volumes of fluid.

The term "precipitation" as employed herein, is intended to be generic to any of the phenomena of syneresis, whether of the rapid flocculation type, or the more gradual shrinkage of hydrogels which may occur upon drying or standing. The essential requirement appears to be that the polymerization of silicate units to a siloxane structure which occurs upon syneresis should take place predominantly at the prescribed pH levels, with the result that gels of substantially reduced hydrogel content are obtained.

Any suitable acid may be used for the initial acidification of the silicate solution, preferably a mineral acid such as sulfuric, nitric or hydrochloric. After precipitation, the synerized hydrogel is washed to remove extraneous salts, and dried to the desired water content, preferably between about 0 and 10% by weight.

Silica gels particularly preferred for use herein may be prepared from silicate solutions by any procedure which will bring about the precipitation in synerized form of silica hydrogel from an aqueous solution, hydrosol or hydrogel having a pH in the range of 6 to about 9. The preferred procedure consists of stirring an alkali metal silicate, particularly a sodium silicate solution into excess acid, whereby a metastable acidic silica hydrosol or all-embracing hydrogel is produced having a pH between about 0 and 4.0. The pH of this hydrosol or hydrogel is then adjusted upwardly to the desired level by careful addition of a suitable base such as ammonium hydroxide or sodium hydroxide, and the mixture may then be allowed to stand until the desired hydrogel precipitates in synerized form. Alternatively, to hasten syneresis, the more stable silica hydrogels may be broken into lumps, ground and dried.

Silica gels prepared by precipitation in the pH ranges prescribed herein generally have lower surface areas than the highly adsorbent gels of commerce, which are normally prepared at low pH's, below about 4. The average particle size of the silica gels employed herein generally ranges between about 100 and 300 microns.

A solution or dispersion of the desired silica source preferably having a composition expressed as oxide mole ratios of not greater than about 100 $H_2O/SiO_2$, is contacted at a pH of from 0 to about 4, preferably at a temperature of from about 0 to about 50° C. At these conditions a fine gel is formed very quickly; usually within one minute. The relatively low temperatures and pH conditions are desirable in that they reduce polymerization rate enough to enable thorough mixing. Thorough mixing can be accomplished within a matter of several seconds after which the pH is preferably increased by addition of base. Prolonged aging at low pH is undesirable in that the preferred silicas are formed only within the range of about 6 to about 10. It is, therefore, advisable to limit low pH aging to less than about 30 minutes. The pH of the resultant material is then increased to the desired value by either partial or complete neutralization on the addition of a suitable base. Contacting at the higher pH is preferably conducted at a temperature of about 0 to about 60° C. for a period of at least about 5 minutes prior to contacting with the aluminosilicate reaction mixture. During this final aging period the gel sets to a stable synerized form, generally characterized as being readily filterable as opposed to the more gelatinous gels which retain substantial volumes of entrapped water. As a general rule the resultant gels are non-dispersable in hydrogen bonding solvents, e.g., water, and have substantially lower chemically bound hydroxyl concentrations than silica gels otherwise prepared.

Another precipitation method consists of direct acidification to the desired pH level of the alkaline sodium silicate solution. According to this procedure, the predetermined amount of acid may be stirred rapidly with efficient mixing into a body of the silica solution or dispersion. This procedure is less preferred because the instantaneous pH is more difficult to control, and some precipitation and syneresis of hydrogel may occur in localized areas of high acidity. With suitable control, however, satisfactory results may be obtained, as by continuously flowing the two reactant streams at controlled rates into a turbulent mixing zone, e.g. through an efficient mixing nozzle.

All of the foregoing precipitation methods involve the formation of a siloxane polymer of

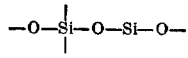

units from dissolved silicic acid or silicate units. Extensive polymerization conditions outside the desired pH range result in the formation of a gel which contains a relative high concentration of silanol, $\equiv$S—OH groups. The hydroxyl concentrations of silica gels prepared by these procedures are roughly at least 30% less than gels prepared at other conditions. Whether the unexpected affinity of these silica gels for the formation of highly silicious crystalline zeolite Y is attributable to the relative absence of silanol groups or the consequent greater concentration of siloxane structure is not provable with certainty. However, it is reasonable to conclude that one or both of these factors account for the greatly improved performance of these silicas in the production of silica rich crystalline aluminosilicates.

These methods are believed to involve the initial formation of an essentially monomeric silicic acid solution, which is then allowed to polymerize within the prescribed pH range. Where rapid flocculation occurs, the silicic acid solution is very transient; in other cases it may persist for longer periods of time as evidenced by the phenomenon of slow syneresis. It is not essential that the intermediate silicic acid solution be prepared by acidifying sodium silicate solutions. Any other method may be employed which will give a silicic acid solution within the prescribed pH range, as, e.g., by passing sodium silicate solution through an anionic exchange resin, or by hydrolyzing silicon tetrachloride in water at the proper pH.

Crystallization of zeolite

To effect crystallization of Y zeolite, the silica gels prepared as described above are simply admixed with water, sodium aluminate and sodium hydroxide in the proper ratios, and the resulting mixtures are allowed to digest at elevated temperatures until crystallization is essentially complete. Preferably the digestion period is preceded by a low temperature aging period at temperatures of about 10°–50° C. for about 1–72 hours, preferably 10–50 hours. The low temperature aging step is generally beneficial in increasing the ultimate yield of Y zeolite. The actual crystallization is generally effected at elevated temperatures of at least about 80° C. for at least about 16 hours. However, more desirable reaction and crystal growth rates are achieved at 50° to 125° C., preferably 85° to 110° C., at which temperatures crystallization will be essentially complete in about 2–100 hours, usually about 24 to 72 hours.

The resulting solid product can be easily recovered from the remaining aqueous reaction medium by any one of numerous available procedures such as filtration and decantation. The thus separated product is then preferably water washed and dried, preferably by heating at a temperature of at least 80° to about 400° C. for 2 hours. The resulting zeolite can be used directly as an ion exchange medium, absorbent or catalyst or catalyst substrate, either with or without calcination, ion exchange or impregnation with chemically active components.

Normally, the reaction mixture is allowed to remain quiescent during the entire aging period and the crystallization period. The resulting slurry is then filtered, and the crystals are washed with distilled water and dried according to conventional procedures.

The broad range of operable reactant ratios for producing zeolite Y is as follows:

|  | Range 1 |
|---|---|
| $Na_2O/SiO_2$ | 0.2–0.6 |
| $SiO_2/Al_2O_3$ | 7–30 |
| $H_2O/Na_2O$ | 20–70 |

The lower $Na_2O/SiO_2$ ratios in the above range are preferably employed in conjunction with the lower $H_2O/Na_2O$ ratios, and the higher $Na_2O/SiO_2$ ratios are employed in conjunction with the higher $H_2O/Na_2O$ ratios. Specifically preferred ranges are as follows:

|  | Range 2 | Range 3 |
|---|---|---|
| $Na_2O/SiO_2$ | 0.35–0.5 | 0.2–0.35 |
| $SiO_2/Al_2O_3$ | 7–20 | 7–20 |
| $H_2O/Na_2O$ | 40–60 | 20–40 |

Range 2 above is disadvantageous in that relatively large volumes of reactants are involved, but appears to be advantageous in that a Y zeolite having somewhat higher $SiO_2/Al_2O_3$ mole ratios is generally produced. Range 3 is advantageous in that it involves a minimum total volume of reactant solution. The $SiO_2/Al_2O_3$ mole-ratio of zeolites produced by operating in range 3 normally falls between about 4.0 and 5.0.

In any of the above ranges, preferred $SiO_2/Al_2O_3$ ratios fall in the narrow range of 8–10; these low ratios provide maximum economy in utilization of the silica gel reactant.

The zeolite compositions prepared as above described ordinarily comprise about 50–90% by weight of crystalline material conforming to the X-ray diffraction pattern for Y zeolites. In the data presented herein, the percentage of zeolite Y in the solid product is determined by means of quantitative X-ray and/or adsorption measurements referred to standard zeolite Y samples as follows:

$$\frac{I_1}{I_2} \times 100 = \text{percent zeolite } Y$$

where
$I_1$=Sum of intensities of suitable X-ray lines measured on the zeolite Y sample, and
$I_2$=Sum of intensities of the same X-ray lines measured on the pure zeolite Y reference standard.

The sodium zeolite crystals prepared as above described are basically three-dimensional frameworks of $SiO_4$ and $AlO_4$ tetrahedra cross-linked by the sharing of oxygen atoms. The electro-valence of each tetrahedron containing aluminum is balanced by the presence in the aluminosilicate framework of a cation such as sodium ion. The void spaces in the framework are occupied by water molecules.

The high silica/alumina mole-matio in these zeolites is believed to be due to the substitution in the crystal lattices of $Si^{+4}$ for $Al^{+3}$ ions during the synthesis process. The $Al^{+3}$ ion is larger (radius=0.57 A.) than the $Si^{+4}$ ion (radius=0.39 A.). As the silica/alumina mole-ratio increases, the small $SiO_4$ tetrahedra substitute for the larger $AlO_4$ tetrahedra, and there is a small but real decrease in the unit cell volume as indicated by the value of the crystal lattice constant, $a_0$. Thus, for zeolite Y compositions having $SiO_2/Al_2O_3$ mole-ratios ranging from about 3.9 up to about 6.0 the unit cell constant, $a_0$, changes from 24.77 A. to about 24.52 A. If the high $SiO_2/Al_2O_3$ ratios found in these compositions were merely due to the presence of amorphous or non-structural $SiO_2$, no variation in the cell dimension $a_0$, would be observed.

Measurement of the lattice constant, $a_0$, by means of careful X-ray spectrometer scanning, therefore provides a reliable method for determining the structural $SiO_2/Al_2O_3$ ratio of zeolite Y products, the relationship between the lattice constant and $SiO_2/Al_2O_3$ content having been established.

Because of the observed decrease in unit cell dimensions with increasing $SiO_2/Al_2O_3$ ratio, there is necessarily a small concomitant shift observed in the positions of particular interplanar or d-spacings which characterize these zeolite Y compositions, according to the well known relationship for a cubic crystal:

$$d_{h,k,l} = a_0 \sqrt{h^2 + k^2 + l^2}$$

where $h$, $k$ and $l$ are the Miller indices. Occasionally, minor variations in intensities and/or positions of the lines or peaks in the X-ray diffraction patterns of the herein described sodium zeolite Y compositions may be observed, due to variables such as the particular X-ray technique and/or apparatus employed, orientation of the powder crystals, the degree of hydration thereof, etc., but nevertheless they all conform to the pattern essentially as shown in Table 1 below.

The values for the interplanar spacing, $d$, are expressed in angstrom units (A.). The relative intensity of the lines of the X-ray powder diffraction pattern are expressed on the relative basis of 100 for the strongest peak. X-ray powder diffraction pattern of Table 1 typifies for crystalline sodium zeolite Y obtained on a Geiger counter spectrometer with pen recorder using filtered copper K-alpha radiation ($\mu = 1.54050$ A.).

TABLE 1

| $h^2+k^2+l^2$ | $d$, A. | Relative intensity |
| --- | --- | --- |
| 3 | 14.15–14.65 | 100 |
| 8 | 8.67–8.85 | 18 |
| 11 | 7.39–7.53 | 14 |
| 19 | 5.62–5.71 | 42 |
| 27 | 4.72–4.79 | 17 |
| 32 | 4.33–4.40 | 28 |
| 40 | 3.88–3.93 | 8 |
| 43 | 3.74–3.79 | 41 |
| 48 | 3.54–3.58 | 3 |
| 51 | 3.43–3.48 | 5 |
| 56 | 3.28–3.32 | 27 |
| 59 | 3.19–3.24 | 6 |
| 67 | 3.00–3.04 | 12 |
| 72 | 2.89–2.93 | 16 |
| 75 | 2.83–2.88 | 35 |
| 80 | 2.74–2.78 | 12 |
| 83 | 2.69–2.73 | 4 |
| 88 | 2.61–2.65 | 11 |
| 91 | 2.57–2.61 | 5 |
| 108 | 2.36–2.39 | 7 |

When the sodium zeolites of this invention are converted to hydrogen zeolites, or to other zeolitic metal forms, they still conform with slight displacements to the above diffraction pattern. The persistence of the same crystal form in the hydrogen zeolites is a distinguishing characteristic of the Y sieve zeolites; the crystal structure of other molecular sieve zeolites, e.g., the X type, collapses upon conversion to the hydrogen form.

The following examples are cited to illustrate the invention, but are not to be construed as limiting in scope.

EXAMPLES

A series of silica gels precipitated at various pH's were prepared as follows for use in the succeeding examples. The starting material for all gels was "N-brand" sodium silicate [1] having a specific gravity of 1.4 and containing 9.1% $Na_2O$, 29% $SiO_2$ and 61.9% $H_2O$.

Gel A—pH 4: A 8.3 wt. percent silicate solution was formed by adding 1130 ml. "N-brand" sodium silicate to 5600 ml. water. The solution was added to 500 ml. 35% sulfuric acid to produce a silicic acid sol having a pH of 4 at a temperature of 15° C. This silicic acid sol was immediately spray dried at 110° C.; washed until the filtrate was sulfate free; and re-dried for 60 hours at 100° C. to 8.9% $H_2O$.

Gel B—pH 7.0: A 9.7 wt. percent sodium silicate solution was prepared by adding 2100 ml. of "N-brand" sodium silicate to 8400 ml. water. The solution was added to 702 ml. of 12 N sulfuric acid to reduce the pH to 2.5, at a temperature of 10° C. The resulting silicic acid sol was stirred vigorously and immediately adjusted to pH 7.0 by adding 28% aqueous ammonia. This media was stirred at 15° C. for 20 minutes, during which period a stable hydrogel was formed. The resulting hydrogel was water washed over a filter until the filtrate was sulfate-free and then dried at 77° C. for 40 hours and ground through a 0.010" mesh slotted screen. The final water content was 5.5% as determined by drying at 538° C. for 2 hours.

Gel C—pH 7.6: A 9.7 sodium silicate solution was prepared by admixing 2100 ml. "N-brand" silicate with 8000 ml. water. This solution was added to 702 ml. of 12 N sulfuric acid and the mixture was allowed to stand for 5 minutes at 13° C. at a pH of 2.5. The solution developed an opaque milky appearance indicating the resolution of a silicic acid sol. The pH was then raised to 6.0 by the addition of 28% aqueous ammonia and the sol rapidly set to a firm gel at pH 6.0. The gel was quickly broken up and slurried in 3000 ml. water and the pH was raised to 7.6 by the addition of ammonium hydroxide. The resulting slurry was maintained at a temperature of 15° C. and a pH of 7.6 for 30 minutes to effect syneresis of the hydrogel. The slurry was then filtered and water washed sulfate-free, dried, and ground through a 0.010" slotted screen. The powder, which appeared damp after grinding, was redried for 48 hours at 99° C. to a final water content of 7.1%, determined by drying at 538° C. for 2 hours.

Gel D—pH 4.0: A 9.7% sodium silicate solution was formed by dissolving 1050 ml. of the "N-brand" sodium silicate in 4000 ml. water. This solution was added to 380 ml. 12 N sulfuric acid to reduce the pH to 2.1. The pH was raised to 4.0 within 5 minutes by adding 28% aqueous ammonia. The resulting silicic acid sol was allowed to set to a firm gel by standing overnight at room temperature (21° C.). The gel was broken up and slurried with 2500 ml. water, then filtered and washed with 1500 ml. water. The gelatinous character of the slurry hindered the washing; consequently the filter cake was dried, ground, and then water washed to remove sulfate. The purified gel was finally redried at 99° C. for 48 hours to 8.2% $H_2O$ as determined by weight loss on calcination for 2 hours at 538° C.

Gel E—pH 9.0: A 9.7 wt. percent sodium silicate solution was prepared by adding 1050 ml. of the "N-brand" sodium silicate to 4000 ml. $H_2O$. The pH of the solution was reduced to 2.1 by admixture with 380 ml. 12 N $H_2SO_4$ at 10° C. The sol which formed was quickly admixed with sufficient 28% aqueous ammonia to raise the pH to 4.0 and the mixture was allowed to set at this pH at a temperature of 10° C. for 15 minutes, during which a light gel was formed. This combination was then slurried in 1500 ml. water and sufficient 28% ammonia to raise the pH to 9.0 at a temperature of 15° C. for 30 minutes. The synerized slurry was filtered, water washed to remove sulfate, and dried for 16 hours at 60° C., ground, and then redried 16 hours to 99° C. to 6.0% $H_2O$, indicated by weight loss at 539° C. for 2 hours.

Gel F—pH 0: A 22 wt. percent sodium silicate solution was prepared by adding 755 ml. "N-brand" sodium

---

[1] Marketed by Philadelphia Quartz Co., Philadelphia, Pa. as "N-brand" sodium silicate.

silicate to 970 ml. water. This solution was acidified to a pH of 0 by addition of 432 ml. 12 N sulfuric acid. This strongly acidic mixture was allowed to stand for two days (48 hours) at a temperature of 21° C. until syneresis was completed. The gel was then broken into coarse granules, washed with 4000 ml. water and dried 16 hours at 60° C. The partially dried gel was washed until the filtrate was sulfate-free and redried for 48 hours at 99° C. to 11.2% $H_2O$, determined by drying at 538° C. for 2 hours.

Each of these silicas was analyzed for hydroxyl, i.e., bound water content, by the method discussed by J. A. Hockey in the Journal of Chemistry and Industry, Jan. 9, 1965, page 57. A sample of each silica was dried for 16 hours at 110° C. to remove essentially all physically extrained water. No further detectable water loss resulted by continued heating at the noted temperature. The dried samples were then ignited, i.e., calcined, at 1100° C. for 2 hours to expel chemically bound water. The relative weight losses of the silicas prepared in accordance with the invention were consistently at least 30% less than the corresponding loss for silicas otherwise prepared, indicating a correspondingly lower hydroxyl concentration. These values are presented in Table 2.

Example 1

Samples of the dried silica gels prepared as described above were stirred at 5–10° C. with sodium hydroxide-sodium aluminate solutions, aged overnight at room temperature, and then aged at 99° C. for 40–60 hours. The resulting aluminosilicates were washed 4 times with 20 volumes $H_2O$ per volume aluminosilicate over a filter at 27° C. and dried at 93° C. for 16 hours. The mole-ratio of reactants was as follows: $Na_2O/SiO_2$, 0.28; $SiO_2/Al_2O_3$, 9.0; and $H_2O/Na_2O$, 25.

The results of these preparations are listed in Table 2.

TABLE 2

| Silica gel employed | | | Product | | |
|---|---|---|---|---|---|
| Prep. No. | Ref. No. | pH | Equivalent [f] bound water, wt. percent | Y zeolite [e] | $SiO_2/Al_2O_3$ [d] |
| 1 | F | 0 | 7.00 | None | |
| 2 | A | 4.0 | | None | |
| 3 | D | 4.0 | 5.70 | [e] 23 | |
| 4 | B | 7.0 | | 81 | 4.52 |
| 5 | B [b] | 7.0 | | 81 | 4.33 |
| 6 | C | 7.6 | 3.75 | 81 | 4.70 |
| 7 | E | 9.0 | 3.97 | 60 | 5.04 |

[a] $H_2O/Na_2O$ ratio was 33 in this preparation.
[b] This gel was precalcined at 427° C.
[e] Percent of total solid product evidencing crystalline structure having a characteristic Zeolite-Y crystalline powder diffraction pattern comparable to that presented in Table 1.
[d] Structural ratio determined from cell constant by X-ray diffraction.
[f] Weight loss of samples dried at 110° C. for 16 hours on calcination at 1,100° C. for 2 hours.
[e] The relative amount of crystalline Y-Zeolite in this product was too low to enable determination of the structural $SiO_2/Al_2O_3$ ratio.

From the foregoing data it is apparent that the silica gels B, C and E prepared in accordance with this invention having reduced hydroxyl levels less than 4 wt. percent, gave good yields of Y zeolite having high structural silica/alumina ratios, whereas the gels otherwise prepared did not form any Y zeolite. In these latter cases, the major product was either amorphous material or phillipsite type crystals. It should also be noted that the uncalcined gel (B) of preparation No. 4 was at least as active, if not more active than the precalcined gel (B) of preparation No. 5.

Example 2

The preparations described in Example 1 were repeated with the exception that a higher $Na_2/SiO_2$ mole-ratio was employed. Reactant ratios were as follows: $Na_2O/SiO_2$, 0.39; $SiO_2/Al_2O_3$, 9.0; and $H_2O/Na_2O$, 25.

The results of these preparations are presented in Table 3.

TABLE 3

| Silica gel employed | | | | Product | |
|---|---|---|---|---|---|
| Prep. No. | Ref. No. | pH | $H_2O$ [e] wt. percent | Equivalent [f] bound water, wt. percent | Y-zeolite [e] | $SiO_2/Al_2O_3$ [d] |
| 8 | F | 0 | 11.2 | 7.00 | 23 | |
| 9 [h] | A | 4.0 | 8.9 | | None | |
| 10 | D | 4.0 | 8.2 | 5.70 | 17 | |
| 11 | B | 7.0 | 5.5 | | 73 | 3.63 |
| 12 | B | 7.0 | 0.0 | | 72 | 3.34 |
| 13 | C | 7.6 | 7.6 | 3.75 | 51 | 3.86 |
| 14 | E | 9.0 | 6.0 | 3.97 | 29 | |

[a][d][f] See footnotes to Table 2.
[h] $H_2O/Na_2O$ ratio was 27 in this preparation.
[e] Determined by weight loss on calcination for two hours at 1000° F.

The foregoing data show that by increasing the sodium content of the reaction mixture, minor yields of Y zeolite can be obtained from silica gels prepared in highly acidic media. However, the silica/alumina mole-ratio of these products was consistently below 3.9. It is also apparent that much higher yields of Y zeolite are obtained by using the gels prepared in accordance with this invention.

Example 3

Preparation No. 11 of Example 2 was repeated except that additional water was added to provide a reaction mixture wherein the $H_2O/Na_2O$ mole ratio was 50. In this case a product was obtained which was 60% Y zeolite having a structural $SiO_2/Al_2O_3$ mole-ratio of 5.38 as determined by X-ray spectra. Thus it is apparent that the high $Na_2O/SiO_2$ ratios employed in Example 2 can be utilized to obtain a high $SiO_2/Al_2O_3$ ratio zeolite if higher water proportions are utilized.

Example 4

To demonstrate the deleterious effect of residual water in the silica gel on Y zeolite formation, an additional silica gel was prepared by contacting at a pH of 7.0 using the procedure described for gel E above. One portion of this gel was dried to a water content of 41.4% and another portion to a water content of 7.14% as determined by calcination at 1000° F. for 2 hours. Each gel was then digested for 48 hours at 99° C. in an aqueous sodium hydroxide-sodium aluminate solution wherein the equivalent oxide mole-ratios of the reactants were as follows: $Na_2O/SiO_2$, 0.34; $SiO_2/Al_2O_3$, 9.0; and $H_2O/NaO$, 21.

The resulting aluminosilicates were washed 4 times with 20 volumes $H_2O$ per volume aluminosilicate over a filter at 27° C. and dried at 93° C. for 16 hours.

The results of these preparations are presented in Table 4.

TABLE 4

| Silica gel employed | | | Product | |
|---|---|---|---|---|
| Prep. No. | pH | $H_2O$,[e] wt. percent | Y-zeolite [e] | $SiO_2/Al_2O_3$ [d] |
| 16 | 7.0 | 41.4 | 73 | 4.34 |
| 17 | 7.0 | 7.14 | 88 | 4.28 |

[e][d][e] See footnotes to Tables 2 and 3.

It is evident from the foregoing that for best results it is desirable to reduce the entrained water content of the silica gel to below about 20%, and preferably below 10%.

Further investigations were conducted to clarify the characteristic differences between silica gels which possess a marked affinity for the production of highly crystalline zeolite Y and those which have little affinity for the Y zeolite production. Several of the parameters involved in the formation of these gels were investigated. These were silica concentration, low pH, effect of silica concentration on low pH aging, pre-aging, gel formation rate and the degree of weight loss attributable to surface bound hydroxyl groups as opposed to hydroxyl groups bound on the interior of the finished silica gel matrix.

This latter characterization is discussed in more detail by M. L. Hair, "Infrared Spectroscopy in Surface Chemistry," Marcel Dekker, Inc., 1967, page 85. The procedure generally involves the calcination of duplicate gel specimens at two different temperatures at which the predominance of the respective hydroxyl groups are expelled. All of the gels were pre-calcined at 110° C. for 16 hours. Surface bound hydroxyl contents were determined by calcination of the dried gels at 427° C. for two hours. The weight loss of the samples thus calcined on further ignition, i.e., calcination, at 1100° C. for 2 hours was attributed to the dissociation of silanol groups located on the interior of the silica gel matrix. As demonstrated by the illustrative examples hereinafter presented, silicas prepared by gel precipitation, e.g., polymerization of silicic acid units at pH values outside the prescribed range, have hydroxyl contents equivalent to more than 6% total volatiles as determined by this procedure. On the other hand, gels prepared by polymerization within the prescribed pH range have appreciably lower total hydroxyl contents of less than 4% volatiles, representing a reduction of at least 30%.

Six gels were prepared from a stock silicic acid solution obtained by diluting 755 ml. of N brand sodium silicate with 970 ml. water. Acidification of the resultant solution with 432 ml. of 12 N $H_2SO_4$ produced a clear silicic acid solution having an equivalent $H_2O/SiO_2$ mole-ratio of 21.8 and an initial pH of 1.0.

Gel-G: A dilute silicic acid solution was prepared by the addition of 1000 ml. water to 360 ml. of the stock solution previously described ($H_2O/SiO_2$=90). This combination was allowed to stand 20 hours at room temperature. During this aging period the pH of the system increased from 1.0 to 1.3. However, a stable gel was not formed. The diluted silicic acid remained as a free-flowing liquid throughout this aging period. The pH of the system was then increased to 7.7 by the rapid addition of 40 ml. of 15 N ammonium hydroxide. A gelatinous filterable precipitate formed immediately. This product was collected by filtration and washed repeatedly with distilled water until the filtrate contained no detectable sulfate.

Gel-H: A 360 ml. portion of the silicic acid solution which had aged for 40 minutes subsequent to preparation of the stock solution was diluted with 1000 ml. water. The pH of the dilute system was 1.0. The addition of 30 ml. 15 N ammonium hydroxide increased the pH to 7.6 and caused immediate gel formation. The product was filtered and washed as previously described.

Gel-I: A 360 ml. portion of the silicic acid solution was aged for 3 hours at room temperature. During this time sufficient silicic acid was polymerized to form a glassy gel. This gel was broken up and slurried in 1000 ml. distilled water. The resulting slurry had a pH of 1.3. The gel was recovered by filtration and water washed until the filtrate was sulfate free. Neutralization of the initial filtrate with ammonium hydroxide produced immediate gelation. This result was indicative of the fact that a substantial amount of unpolymerized silicic acid remained in the original slurry.

Gel-J: A glassy gel was formed by aging 360 ml. of the original stock solution for three hours and 20 minutes at room temperature (24° C.). The resultant gel was slurried in 1000 ml. distilled water to produce a slurry having a pH of 1.3. This system was aged for 16 hours at room temperature after which the pH was increased to 7.6 by the addition of 30 ml. of 15 N ammonium hydroxide. This product was filtered and washed as previously.

Gel-K: A similar 360 ml. portion of the stock silicic acid solution was aged for 80 minutes at room temperature during which time no apparent gel formation occured. The pH of the resulting system was increased to 9.8 by the rapid addition of 100 ml. of 15 N ammonium hydroxide which produced the almost immediate formation of a stable gel. The product was collected and washed as previously.

Gel-L: A glassy unstable gel formed by aging 360 ml. of the stock silicic acid solution for 23 hours at room temperature was slurried in 1000 ml. water, filtered and washed sulfate free as previously described.

Gel-M: A commercial silica, Davison Grade 12 silica gel powder containing 6 wt. percent physisorbed water as received was partially peptized by slurrying in 2 N NaOH. The resultant slurry was then aged for 72 hours with sodium aluminate in an aluminosilicate reaction mixture having a composition indicated by equivalent oxide mole-ratios of 20 $SiO_2/Al_2O_3$, 0.4 $Na_2O/SiO_2$ and 40 $H_2O/Na_2O$. No crystallization occurred even after this extensive aging period. (The silica gel employed in this example is available as "Grade 12 Silica Gel" from the Davison Chemical Division of W. R. Grace and Company, Baltimore, Md.

Parallel weight loss tests at two different calcination temperatures were run on duplicate samples of gels B through L. Each sample was pre-dried for 16 hours at 110° C. One of each set of duplicates was then calcined for 2 hours at 427° C. and the second was calcined for 2 hours at 1100° C. Weight loss during each calcination was determined. The equivalent hydroxyl loss for each sample was calculated from the weight loss values. The relative hydroxyl loss as indicated by the equivalent Si/OH mole-ratio was also determined for each specimen. All of these results are reported in Table 5.

TABLE 5

| Silica | SiO₂ preparation | | Hydroxyl content, LOI[1] | | | | Total—OH content, wt. percent | Aluminosilicate | |
|---|---|---|---|---|---|---|---|---|---|
| | pH | H₂O/SiO₂ | 110-427° C. | | 427-1,100° C. | | | Percent Y | SiO₂/Al₂O₃ |
| | | | Percent LOI | Si/OH | Percent LOI | Si/OH | | | |
| B | 7.0 | 44 | | | | | | 81 | 4.52 |
| C | 7.6 | 42 | 3.04 | 4.8 | 0.713 | 21 | 3.74 | 81 | 4.70 |
| D | 4.0 | 42 | 3.33 | 4.4 | 2.38 | 6.2 | 5.71 | 23 | |
| E | 4-9.0 | 42 | 3.32 | 4.4 | 0.647 | 23 | 3.97 | 60 | 5.04 |
| F | 0 | 19 | 4.63 | 3.1 | 2.37 | 6.2 | 7.00 | 0 | |
| G | 7.7 | 90 | 2.42 | 6.1 | 1.34 | 11.1 | 5.66 | | |
| H | 7.6 | 90 | 2.46 | 6.0 | 1.24 | 11.9 | 3.70 | | |
| I | 1.3 | 22 | 3.65 | 4.0 | 2.48 | 5.9 | 6.13 | | |
| J | 1.3 | 22 | 3.58 | 4.0 | 2.63 | 5.6 | 6.21 | | |
| K | 1.3-9.8 | 26 | 2.38 | 6.2 | 1.60 | 9.2 | 3.98 | | |
| L | 1.6 | 22 | 3.94 | 3.7 | 2.81 | 5.2 | 6.75 | | |
| M | Davison Grade 12 | | | | 3.19 | 4.6 | | 0 | |

[1] Weight loss on ignition.

The following conclusions are several of those which derive from a comparison of the operations discussed and reported in Table 5.

Comparison of gels B and C to gels D and F and the response of those products in the aluminosilicate reaction phase indicates that the silica gels formed in accordance with the procedures of this invention, i.e., gels B and C, have considerably lower total water content and greatly reduced interior hydroxyl content as indicated by high temperature calcination, and are far superior as precursors in the production of silica-rich zeolite Y.

Comparison of gels C and H to gels D and L respectively, indicates that aging, i.e., polymerization, at low pH results in higher interior hydroxyl content. This procedure should be avoided if convenient, in that significant polymerization at low pH diminishes the quality of the silica gel for the production of silica-rich Y zeolite, i.e., Y zeolite having silica to alumina mole-ratios in excess of 3.9.

Comparison of gels C and G demonstrates that increasing the reactant silica concentration during gel formation reduces the concentration of interior hydroxyl groups.

Comparison of gels G and H indicates that pre-aging a silicic acid solution prior to neutralization, at least within the ranges prescribed by these gels, does not affect the interior hydroxyl content provided the silica concentration is sufficiently low to avoid substantial polymerization gel formation.

Comparison of gels E, H and K demonstrates that pre-aging of a relatively concentrated silicic acid solution at relatively low pH prior to neutralization results in higher interior hydroxyl structure. It seems reasonable to attribute this occurrence to the fact that silica concentration in these preparations was sufficiently high to promote a substantial degree of polymerization at the lower pH.

Comparison of gels J and L illustrates that the admixture of a gel formed at a relatively low pH with a neutral slurry does not appreciably affect the interior hydroxyl content. The occurrence of substantial polymerization at low pH apparently results in the irreversible formation of silanol structure which is not affected by further exposure to conditions less conducive to silanol structure.

Analysis of these results, particularly by way of the comparisons above referred to, provides considerable insight into the manner and degree by which the several relevant parameters influence the activity of a finished silica gel for the production of highly siliceous Y zeolites having silica to alumina mole-ratios in excess of 3.9. The most significant conclusions appear to be that a suitable silica gel can be made at a wide variety of concentrations, provided substantial pre-aging of relatively concentrated systems at a relatively low pH is avoided. It is most apparent that a substantial degree of polymerization at the conditions prescribed by this invention is absolutely essential. Limited pre-aging of dilute systems at low pH can be tabulated but is not preferred, in that the formation of inactive silica structure at low pH is apparently irreversible. It is, therefore, preferred that gels formed by initial contacting at low pH (to enable complete dispersion) have $SiO_2/H_2O$ ratios greater than 20 and that exposure to low pH be limited, i.e., less than 5 minutes.

It is also apparent from the results obtained with Gel M that the gels prepared in accordance with this invention possess characteristics which render them far more active for the production of highly siliceous zeolite Y than commercially available products heretofore considered equivalent. This observation is further evidenced by the results obtained by the use of Davison Grade 63 silica gel. The reaction of this material with sodium aluminate is illustrated by Example XIX, column 12 of U.S. Patent 3,130,007 and produced a Y zeolite having a $SiO_2/Al_2O_3$ ratio of only 3.6.

It is not intended that the invention should be limited to the details described above since many variations may be made by those skilled in the art without departing from the scope or spirit of the following claims.

I claim:

1. The method of producing zeolite Y having a silica to alumina ratio of at least about 3.9 which comprises
  (a) contacting at least one silica source selected from silicic acid, alkali metal silicates, silica hydrogels and silica hydrosols with an aqueous medium at a pH within the range of about 6 to about 10 at a temperature and for a time sufficient to form a synerized silica gel containing not more than about 4 weight percent of chemically bound water at a pH within the range of about 6 to about 10, and
  (b) reacting the thus synerized gel with sodiu aluminate in a reaction medium formed on admixture of said synerized silica gel and said sodium aluminate in proportions sufficient to provide a composition expressed as oxide mole-ratios within the range of about 0.2 to about 0.6 $NaO_2/SiO_2$, about 7 to about 30 $SiO_2/Al_2O_3$ and about 20 to about 70 $H_2O/Na_2O$ at a temperature and for a time sufficient to produce zeolite Y.

2. The method of claim 1 wherein said gel is formed upon contacting at least one of monosilicic acid and an alkali metal silicate with an aqueous medium at an equivalent $H_2O/SiO_2$ oxide mole-ratio less than about 130 at a first pH below about 6 for a time insufficient to form a synerized gel thereafter further contacting at a second pH within the range of 6 to about 10 for a period sufficient to form a synerized gel.

3. The method of claim 1 wherein said gel is formed on contacting at least one silica source selected from (a) silicic acid, (b) alkali metal silicates, (c) silica hydrogels and hydrosols formed on contacting one of silicic acid and alkali metal silicates with an aqueous medium at an equivalent $H_2O/SiO_2$ mole-ratio less than about 130 for a period insufficient to form a synerized gel, and (d) at least one of (a), (b) and (c) in combination with up to 20 wt. percent of an alkaline earth metal silicate based on total equivalent silica content, at a pH withtin the range of 6 to about 9 for at least about 5 minutes.

4. The method of claim 3 wherein said silica source is contacted at said pH within said range of 6 to about 9 at a silica concentration equivalent to a $H_2O/SiO_2$ mole ratio within the range of 20 to about 100 at a temperature within the range of 0 to about 60° C. for at least about 5 minues, and said gel is water washed prior to reacting with said sodium aluminate.

5. The method of claim 2 wherein said silica source is contacted with said medium at said first pH for a period of less than about 30 minutes, said first pH is less than about 4, said further contacting at said second pH is effected at an equivalent silica concentration corresponding to a $H_2O/SiO_2$ mole ratio within the range of 10 to about 100 at a temperature of 0 to about 90° C. for at least about 20 minutes.

6. The method of claim 1 wherein said silica source is sodium silicate, and precipitated silica gel is formed on contacting said silica source at a pH below about 6 at an equivalent silica concentration corresponding to $H_2O/SiO_2$ mole-ratios within the range of 20 to about 130 for less than 15 minutes in the presence of a strong mineral acid and thereafter increasing the pH by the addition of base to a value within the range of 6 to about 9 for at least about 20 minutes.

7. The method of claim 1 wherein said synerized silica gel is contacted with said sodium aluminate in said reaction mixture of step (b) at a temperature of about 50 to about 125° C. for about 2 to about 100 hours.

8. The method of claim 7 wherein the water content of said silica gel is reduced to less than about 20 wt. percent prior to admixture with said sodium aluminate.

9. The method of producing zeolite Y having a silica to alumina mole ratio of at least about 3.9 which comprises:
  (a) contacting at least one silica source selected from monosilicic acid and alkali metal silicates with an aqueous medium at a first pH of less than about 6 at a temperature and for a period of time insufficient to form a precipitated silica gel,
  (b) further contacting the resultant composition with an aqueous medium at a second pH of about 6 to about 10 at a temperature and for a time sufficient to effect substantial syneresis thereof to form a synerized silica gel containing not more than about 4 weight percent chemically bound water at said pH from about 6 to about 10, and
  (c) reacting said synerized silica gel with sodium aluminate in a reaction medium formed on admixture of said synerized gel and said sodium aluminate in proportions sufficient to provide a composition expressed as oxide mole-ratios within the range of about 0.2 to about 0.6 Na$_2$O/SiO$_2$, about 7 to about 30 SiO/Al$_2$O$_3$, and about 20 to about 70 H$_2$O/Na$_2$O at a temperature and for a time sufficient to produce crystalline zeolite Y.

10. The method of claim 9 wherein said silica gel of step (a) is formed by contacting said silica source at said first pH in the presence of a strong mineral acid at a silica concentration corresponding to a H$_2$O/SiO$_2$ mole-ratio less than about 130 at a temperature of about 0 to about 60° C. for less than about 30 minutes, and said resulting composition is contacted at said second pH at a temperature of about 0 to about 90° C. for at least about 5 minutes to form said synerized silica gel.

11. The method of claim 9 wherein said first pH is less than about 4 and said synerized silica source is acidified to said first pH by the gradual addition of said silica source to an aqueous solution of a strong mineral acid, said silica gel is water washed and dried to a water content of less than 20 wt. percent prior to admixture with said sodium aluminate of step (c), and said contacting of step (c) is effected at a pH greater than about 7.

12. The method of claim 1 wherein said synerized silica gel is contacted with said sodium aluminate in said reaction medium having a composition expresed as oxide mole-ratios within the ranges of

|  | Range 2 | Range 3 |
|---|---|---|
| Na$_2$O/SiO$_2$ | 0.35–0.5 | 0.2–0.35 |
| SiO$_2$/Al$_2$O$_3$ | 7–20 | 7–20 |
| H$_2$O/Na$_2$O | 40–60 | 20–40 |

13. The method of claim 9 wherein said silica source is contacted with said aqueous medium at said first pH by passing a solution of said silica source having an equivalent SiO$_2$ concentration represented by a H$_2$O/SiO$_2$ mole-ratio less than about 500 continuously into admixture with a continuous stream of a strong mineral acid in a turbulent flow mixing zone.

14. The method of claim 9 wherein said synerized silica gel is contacted with said sodium aluminate in said reaction medium at a first temperature within the range of from about 10 to about 50° C. for from about 1 to about 72 hours and the temperature of said reaction medium is increased to a higher temperature of about 50 to about 125° C. for about 2 to about 100 hours.

15. The method of claim 9 wherein said silica gel is calcined prior to reacting with said sodium aluminate.

16. The method of producing zeolite Y having a silica to alumina mole ratio of at least 3.9 which comprises:
(a) contacting at least one of monosilicic acid and alkali metal silicates with an aqueous medium at a concentration equivalent to a H$_2$O/SiO$_2$ ratio less than about 500 at a first pH of 0 to about 4 in the presence of a strong mineral acid at a temperature of less than about 60° C. for less than 10 minutes,
(b) increasing said pH to a second value within the range of from about 6 to about 9 and continuing said contacting at a temperature of about 0° C. to about 90° C. for at least about 20 minutes to form a synerized silica gel having not more than about 4 weight percent chemically bound water determined by weight loss upon ignition at 1100° C. for 2 hours of a gel previously dried 16 hours at 100° C.,
(c) separating said gel from said aqueous medium and water washing the resultant separated gel to substantially remove residual aqueous medium, and
(d) reacting the resultant water washed gel with sodium aluminate in an alkaline aqueous reaction mixture formed on admixture of said synerized gel and said sodium aluminate in proportions sufficient to provide a composition expressed as equivalent oxide mole ratios within the range of about 0.2 to about 0.6 Na$_2$O/SiO$_2$, about 7 to about 30 SiO$_2$/Al$_2$O$_3$, and about 20 to about 70 H$_2$O/Na$_2$O at a temperature and for a period of time sufficient to form crystalline zeolite Y.

17. The method of claim 16 wherein the water content of said water washed silica gel is reduced to less than about 20 wt. percent prior to reacting with said sodium aluminate, and the equivalent SiO$_2$/Al$_2$O$_3$ mole-ratio in said reaction mixture is within the range of from about 8 to about 10.

18. The method of claim 16 wherein said gel is reacted with said sodium aluminate at a temperature of at least about 50° C. for a period of at least about 2 hours sufficient to form said crystalline zeolite Y having a silica to alumina ratio in excess of about 3.9 and said reaction mixture has a composition expressed as equivalent oxide mole-ratios within the ranges of

|  | Range 2 | Range 3 |
|---|---|---|
| Na$_2$O/SiO$_2$ | 0.35–0.5 | 0.2–0.35 |
| SiO$_2$/Al$_2$O$_3$ | 7–20 | 7–20 |
| H$_2$O/Na$_2$O | 40–60 | 20–40 |

19. The method of claim 16 wherein said reaction mixture is first maintained at a temperature within the range of from about 10 to about 50° C. for about 1 to about 72 hours and the temperature of said reaction mixture is then increased to a higher value within the range of 50 to about 125° C. for about 2 to about 100 hours.

References Cited
UNITED STATES PATENTS

| | | | |
|---|---|---|---|
| 2,462,236 | 2/1949 | Thomas | 252—451 |
| 2,834,739 | 5/1958 | Becker et al. | 231—182 X |
| 3,227,660 | 1/1966 | Hansford | 252—455 |
| 3,343,913 | 9/1967 | Robson | 23—113 |
| 3,359,068 | 12/1967 | Michalko | 23—112 |

OTHER REFERENCES

Plank: "J. of Colloid Chemistry" vol. 2, No. 4, August 1947, pp. 413–415.

EDWARD J. MEROS, Primary Examiner

U.S. Cl. X.R.

423—339

UNITED STATES PATENT OFFICE
CERTIFICATE OF CORRECTION

Patent No. 3,690,823   Dated September 12, 1972

Inventor(s) Dean Arthur Young

It is certified that error appears in the above-identified patent and that said Letters Patent are hereby corrected as shown below:

Column 15, line 73, "sodiu" should read --sodium--.
Column 16, line 3, "$NaO_2/SiO_2$" should read --$Na_2O/SiO_2$--.
Column 16, line 24, "withtin" should read --within--.
Column 16, line 30, "minues" should read --minutes--.

Signed and sealed this 20th day of March 1973.

(SEAL)
Attest:

EDWARD M. FLETCHER, JR.
Attesting Officer

ROBERT GOTTSCHALK
Commissioner of Patents